United States Patent
Farsad et al.

(10) Patent No.: US 10,866,139 B2
(45) Date of Patent: Dec. 15, 2020

(54) SPECTROMETERS WITH RETRO-REFLECTIVE SURFACES AND RELATED INSTRUMENTS

(71) Applicant: PerkinElmer Health Sciences, Inc., Waltham, MA (US)

(72) Inventors: Mahsa Farsad, New Haven, CT (US); David Aikens, New Haven, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 16/536,695

(22) Filed: Aug. 9, 2019

(65) Prior Publication Data

US 2020/0049558 A1 Feb. 13, 2020

Related U.S. Application Data

(60) Provisional application No. 62/717,153, filed on Aug. 10, 2018.

(51) Int. Cl.
| | |
|---|---|
| *G01J 3/28* | (2006.01) |
| *G01J 3/18* | (2006.01) |
| *G01J 3/02* | (2006.01) |
| *G01J 3/50* | (2006.01) |
| *G02B 5/08* | (2006.01) |
| *G02B 5/04* | (2006.01) |
| *G02B 5/18* | (2006.01) |

(52) U.S. Cl.
CPC ............ *G01J 3/1809* (2013.01); *G01J 3/021* (2013.01); *G01J 3/502* (2013.01); *G02B 5/04* (2013.01); *G02B 5/08* (2013.01); *G02B 5/18* (2013.01)

(58) Field of Classification Search
CPC .......... G01J 3/1809; G01J 3/021; G01J 3/502; G01J 3/12; G01J 3/0208; G01J 2003/1208; G01J 3/2803; G01J 3/0291; G02B 5/08; G02B 5/04; G02B 5/18
See application file for complete search history.

(56) References Cited

U.S. PATENT DOCUMENTS 3,457,416 A * 7/1969 Elliott .................... H04N 7/005
398/201
4,995,721 A 2/1991 Krupa et al.
(Continued)

FOREIGN PATENT DOCUMENTS

WO 2017121583 A1 7/2017

OTHER PUBLICATIONS

Jan. 27, 2020—(WO) International Search Report and Written Opinion—App PCT/US2019/046185.

*Primary Examiner* — Abdullahi Nur
(74) *Attorney, Agent, or Firm* — Banner & Witcoff, Ltd.

(57) ABSTRACT

Certain aspects, configurations, embodiments, and examples of a spectrometer with a compact design are described. In some implementations, the spectrometers according to the present disclosure may be used for optical emission spectroscopy (OES). The spectrometer architecture and imager described herein allows a single detector, compact, and high-throughput spectrometer. One or more aspects include an Echelle grating in a spectrometer that reuses optical surfaces to separate wavelengths of light. For example, in one or more aspects, a reflective triplet telescope acts as both a collimator and imager. By reusing optical components, the relative size of the spectrometer may be reduced.

20 Claims, 4 Drawing Sheets

(56) References Cited

U.S. PATENT DOCUMENTS

| | | | | |
|---|---|---|---|---|
| 5,189,486 A | * | 2/1993 | Florek | G01J 3/1809 |
| | | | | 356/328 |
| 5,260,767 A | | 11/1993 | Cook | |
| 2001/0024275 A1 | * | 9/2001 | Suzuki | G01J 3/1838 |
| | | | | 356/328 |
| 2004/0085535 A1 | * | 5/2004 | Hammer | G01J 3/1809 |
| | | | | 356/330 |
| 2012/0262713 A1 | | 10/2012 | Florek et al. | |

* cited by examiner

SPECTROMETERS WITH RETRO-REFLECTIVE SURFACES AND RELATED INSTRUMENTS

RELATED APPLICATION

The present application claims priority to U.S. Provisional Patent Application No. 62/717,153 filed on Aug. 10, 2018 and titled "SPECTROMETERS WITH RETROREFLECTIVE SURFACES AND RELATED INSTRUMENTS," which is herein incorporated by reference in its entirety.

TECHNOLOGICAL FIELD

Certain configurations are described herein of a spectrometer that may be used to detect one or more wavelengths of light.

BACKGROUND

There are many applications where it is desirable to detect the spectrum of light emitted from a light source or light emitted by a sample being probed by a light source. A spectrometer may be used to detect the spectrum of light. Spectrometers conventionally use a combination of optical elements to spatially separate light of different wavelengths such that an array of detectors that spatially resolves the light may determine the wavelength of the light based on the amount of light detected by each detector of the array of detectors. To spatially separate the different wavelengths, some spectrometers include diffractive, refractive and/or reflective components.

SUMMARY

The number of optical elements used within a spectrometer impacts the overall size of the spectrometer. In space-constrained environments, a spectrometer with a large footprint may displace other useful instruments and thus may not be practical. Spectrometers according to the present disclosure provide a more compact design by reducing the number of optical components. In some implementations, multiple optical functions that are typically performed by separate optical components may be performed by a single optical component. In some implementations, the physical footprint of spectrometer may be reduced by using at least one optical component at least two times. For example, a mirror, mirror system, prism, or grism may be used two or more times along a path followed by light inside the spectrometer. One or more aspects of the disclosure include a spectrometer based on reusing optical surfaces to separate wavelengths of light. In some implementations, a reflective triplet telescope may act as both a collimator and imager. By reusing one or more optical components, the relative size of the spectrometer may be reduced. Further, reusing one or more optical components may also reduce the cost of the spectrometer by not requiring independent optical components to perform the same degree of wavelength separations.

According to one aspect, the disclosure relates to a spectrometer. The spectrometer includes an aperture configured to permit passage of light, a dispersive element, an Echelle grating, at least one reflecting surface, and a detector. The at least one reflecting surface is optically coupled to aperture and also is optically coupled to the Echelle grating through the dispersive element. The light received by the aperture is directed to the at least one reflecting surface. The light directed from the aperture to the at least one reflecting surface is reflected by the at least one reflecting surface to the Echelle grating. The light provided by the Echelle grating is directed from the Echelle grating to the at least one reflecting surface. The light directed from the Echelle grating to the at least one reflecting surface is reflected by the at least one reflecting surface to the detector.

In some implementations, the light directed from the aperture to the at least one reflecting surface may be reflected by the at least one reflecting surface to the Echelle grating through the dispersive element, and the light provided by the Echelle grating may be directed to the at least one reflecting surface through the dispersive element. In some implementations, the at least one reflecting surface may include a three-mirror system. In some implementations, the dispersive element may include a prism. In some implementations, the dispersive element may be a double-pass prism. In some implementations, the dispersive element may include a grating. In some implementations, the dispersive element may include a grism.

In some implementations, the three-mirror system may include a reflective triplet telescope. The reflective triplet telescope may include a primary mirror optically coupled to the aperture, a secondary mirror optically coupled to the primary mirror, and a tertiary mirror optically coupled to the secondary mirror. The tertiary mirror may be optically coupled to the Echelle grating through the dispersive element. In some implementations, the spectrometer may receive light from an inductively coupled plasma (ICP) system.

According to another aspect of the present disclosure, another spectrometer is provided. The spectrometer includes an aperture configured to permit passage of light, a dispersive element, an Echelle grating, a mirror system, a mirror, a telescope system, and a detector. The aperture is optically coupled to the mirror system. The mirror system is optically coupled to the Echelle grating, and is optically coupled to the mirror. The light received by the aperture is directed to the mirror system. The light directed from the aperture to the mirror system is reflected by the mirror system to the Echelle grating. The light provided by the Echelle grating is directed from the Echelle grating to the mirror system. The light directed from the Echelle grating to the mirror system is reflected by the mirror system to the detector.

In some implementations, the mirror may be optically coupled to the telescope system through the dispersive element, and the dispersive element is optically coupled to the detector. In some implementations, the mirror system may include a three-mirror. In some implementations, the dispersive element may include a prism. In some implementations, the dispersive element may be a double-pass prism. In some implementations, the dispersive element may include a grating. In some implementations, the dispersive element may include a grism.

In some implementations, the mirror may include a first side opposite a second side. The first side of the mirror may be non-reflective while the second side of the mirror may be reflective. The aperture may be optically coupled to the mirror system through the first side of the mirror. The light received by the aperture may be directed to the mirror system through the mirror. The mirror system is optically coupled to the second side of the mirror. The light directed from the Echelle grating to the mirror system is reflected by the mirror system to the second side of the mirror. In some implementations, the spectrometer may receive light from an inductively coupled plasma (ICP) system.

Additional aspects, configurations, embodiments and examples are described in more detail below.

BRIEF DESCRIPTION OF THE SEVERAL VIEWS OF THE DRAWINGS

Certain specific configurations of a spectrometer, and components thereof, are described below with reference to the accompanying figures in which.

Figure 1:
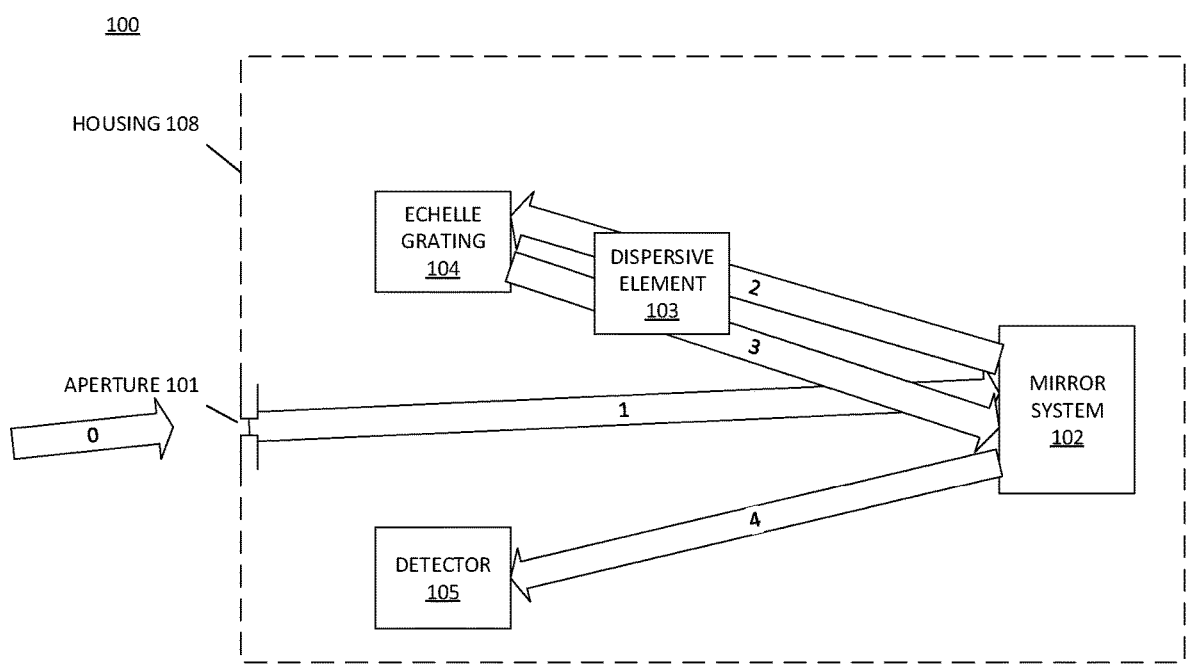
FIG. 1 is a first example of a spectrometer.

It will be recognized by the skilled person in the art, given the benefit of this disclosure, that the exact arrangement, sizes and positioning of the components in the figures is not necessarily to scale or required. The particular sizes and angles of one component relative to another component may vary to provide a desired response or output from the component or the optical spectrometer comprising the component.

DETAILED DESCRIPTION

Spectrometers use a combination of multiple diffractive, refractive and/or reflective optical elements to spatially separate light of different wavelengths. The number of optical elements used within a spectrometer impacts the overall size of the spectrometer. In space-constrained environments, for example, a large spectrometer displaces other useful instruments. Moreover, in environments where physical space is at a premium (e.g., in satellite design and in extraterrestrial applications), it may not be feasible to use larger spectrometers.

Systems and methods according to some embodiments may provide a compactly designed spectrometer. In some implementations, the compact design of the spectrometer is the result of reusing at least one optical component for performing multiple optical functions that are typically performed by separate optical components. In some implementations, a reflective triplet telescope may act as both a collimator and imager. Some embodiments of a spectrometer architecture and imager described herein allow a single detector, compact, and high-throughput spectrometer that addresses the specifications of the next platform OES system. Compactly designed spectrometers, according to some embodiments, may receive light from an inductively coupled plasma system that injects samples into a plasma. Similarly, some embodiments of the OES system described herein may be used with optical absorption spectroscopy or any other type of spectroscopy.

In one or more examples, a physical footprint of a spectrometer may be reduced by using at least one optical component at least two times. For example, a mirror, mirror system, prism, or grism may be used two or more times along a path followed by light inside the spectrometer. One or more aspects include a spectrometer based on reusing optical surfaces to separate wavelengths of light. For example, in one or more aspects, a reflective triplet telescope may act as both a collimator and imager. By reusing one or more optical components, the relative size of the spectrometer may be reduced. Further, reusing one or more optical components may reduce the expense of the spectrometer by not requiring independent optical components to perform the same degree of wavelength separations.

The spectrometer architecture and imager described herein is a single detector, compact, and high-throughput spectrometer. The compact size of the spectrometer as described herein permits it to be used in a variety of applications. In some implementations, the spectrometers according to the present disclosure may be used for Optical Emission Spectroscopy (OES) applications. The compact spectrometer may receive light from an inductively coupled plasma (ICP) light source. For instance, the compact design of the spectrometer may receive light from inductively coupled plasma (ICP) system injecting samples into the plasma. In addition to be being useable with OES, the optical imaging system described herein may be used with optical absorption spectroscopy or any other type of spectroscopy. Additionally or alternatively, because of its compact size, the spectrometer may have particular relevance to space applications (including in orbiting satellites and in extraterrestrial exploratory vehicles).

Various spectrometers and their internal components are described herein, some of which provide compact designs that limit the physical space occupied by the example spectrometers. In some examples, a path of light through a spectrometer may use one or more optical components more than once, which may reduce a physical footprint of the spectrometer as compared to a spectrometer that does not use optical components more than once.

The various concepts introduced above and discussed in greater detail below may be implemented in any of numerous ways, as the described concepts are not limited to any particular manner of implementation. Examples of specific implementations and applications are provided primarily for illustrative purposes.

FIG. 1 provides an example spectrometer 100 according to some implementations. The spectrometer 100 includes a housing 108 shown by dashed lines, an aperture 101 in the housing 108, a mirror system 102, a dispersive element 103, an Echelle grating 104, and a detector 105. An optical input, such as light comprising a plurality of different wavelengths, enters the spectrometer 100 through the aperture 101. In some implementations, the aperture 101 may be a slit. In some implementations, the spectrometer 100 may be part of an inductively coupled plasma (ICP) spectrometer and the aperture 101 may receive light from an inductively coupled plasma (ICP) system wherein samples are injected into a plasma via a sample introduction device. The sample introduction device may be fluidically coupled to a torch. An induction device may provide radio frequency energy into the torch to sustain an inductively coupled plasma in the torch. The aperture 101 may be optically coupled to the inductively coupled plasma in the torch and may receive light emission from analyte species in the inductively coupled plasma in the torch.

The aperture 101 is optically coupled to the mirror system 102. Initial light from a light source is identified by arrow labeled "0". Light entering the aperture 101 is directed to the mirror system 102, as shown in FIG. 1 by an arrow labeled "1" pointing from the aperture 101 to the mirror system 102. In some implementations, the mirror system 102 may be a system that includes a single mirror or a system that includes multiple mirrors. For example, the mirror system 102 may include a three-mirror system such as a reflective triplet telescope or imager. In some examples, the mirror system 102 may include a different number of mirrors. In some implementations, the reflective triplet telescope may include a primary mirror optically coupled to the aperture 101, a secondary mirror optically coupled to the primary mirror, and a tertiary mirror optically coupled to the secondary mirror. The mirror system 102 receives incident light and reflects one or more wavelengths of the incident light.

The mirror system 102 is optically coupled to the dispersive element 103. The mirror system 102 receives the light directed from the aperture 101. The mirror system 102 reflects the incident light to the dispersive element 103, as shown in FIG. 1 by an arrow labeled "2" pointing from the mirror system 102 to and through the dispersive element 103. The dispersive element 103 receives the light reflected from the mirror system 102 and further disperses or spatially separates the wavelengths of the incident light. In some implementations, the dispersive element 103 may be a double-pass reflective prism and may include a grism, a refractive prism, a reflective grating or a refractive grating. In some implementations, the combination of the dispersive element 103 modifying light twice (before and after modification by the echelle grating 104) may have the effect of cross-dispersing light traveling from the echelle grating 104 to the mirror system 102. The terms "cross-dispersing" and "cross-dispersion" are intended to mean dispersing light in a direction perpendicular to a primary dispersion of the spectrometer's components. In effect, light is separated from one continuous transition of wavelengths into multiple orders of light, where each order transitions across wavelengths in each order and the orders are spatially separated from each other, thus allowing a higher degree of wavelength separation and resolution, than by using a single dispersive element.

The dispersive element 103 is optically coupled to the Echelle grating 104. The light reflected by the mirror system 102 travels through the dispersive element 103 and the resulting cross-dispersed light is provided by the dispersive element 103 to the Echelle grating 104 as shown in FIG. 1 by the arrow labeled "2" that points from the mirror system 102, through the dispersive element 103 and to the Echelle grating 104.

The Echelle grating 104 may be a typical Echelle grating comprising a plurality of gratings having widths about the same as the wavelength of the light, resulting in diffraction of the incident light. For example, the Echelle grating 104 may be a reflective grating. With reflective gratings, the reflective portion may be tilted (blazed) to scatter a majority of the light into a desired direction of interest (and into a specific diffraction order). For multiple wavelengths of light, the same general result occurs, but it is possible for longer wavelengths of a higher order to overlap with the next order(s) of a shorter wavelength. In an Echelle grating, this behavior is deliberately selected and the blaze is optimized for multiple overlapping higher orders. The exact blaze angle used may depend on the system level specifications of the spectrometer. The resulting optical output from the Echelle grating comprises stripes with different, but overlapping, wavelength ranges. The downstream optical elements may be used to provide spatial separation in a direction perpendicular to the Echelle grating's diffraction plane to permit detection of each wavelength of light present in an incident optical input received by the spectrometer.

The Echelle grating 104 receives the dispersed light from the dispersive element 103 and further spectrally disperses the light incident on the Echelle grating 104. The diffraction plane of the Echelle grating 104 is perpendicular to the dispersion plane of the dispersive element 103. The light dispersed by the Echelle grating 104 is provided back to the dispersive element 103. The dispersive element 103 disperses the incident light from the Echelle grating 104 at right angles to that of the grating of the Echelle grating 104 and provides the dispersed light back to the mirror system 102 as shown in FIG. 1 by an arrow labeled "3" that points from the Echelle grating 104 through the dispersive element 103 to the mirror system 102.

The mirror system 102 is optically coupled to the detector 105. The mirror system 102 receives the dispersed light from the dispersive element 103 and reflects the incident light to the detector 105 as shown in FIG. 1 by the arrow labeled "4" pointing from the mirror system 102 to the detector 105. Thus, after passing twice through the dispersive element 103, being dispersed by the echelle grating 104, and directed by the mirror system 102, wavelengths of light at the detector 105 may be spatially separated, thereby permitting detection of individual wavelengths at a high resolution. The detector 105 may be any detector that can spatially resolve light incident upon the detector 105. In some implementations, the detector 105 may be a charged coupled device (CCD) camera or a complementary metal-oxide-semiconductor detector.

Figure 2:
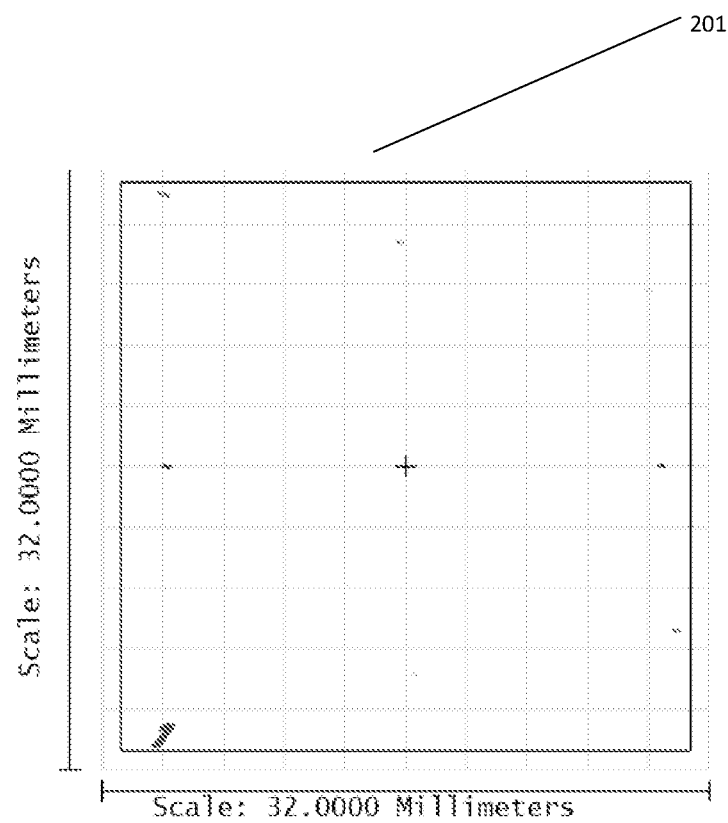
FIG. 2 shows an example Echellogram resulting from one or more spectrometers in accordance with aspects of the disclosure.

FIG. 2 shows an example Echellogram 201 corresponding to a spectrometer with a compact design in accordance with aspects of the disclosure Referring back to FIG. 1, an optical input, such as light, enters the spectrometer 100 through the aperture 101. In some implementations, the spectrometer 100 may be part of an inductively coupled plasma (ICP) spectrometer and the aperture 101 may receive light from an inductively coupled plasma (ICP) system wherein samples are injected into a plasma via a sample introduction device. The sample introduction device may be fluidically coupled to a torch. An induction device may provide radio frequency energy into the torch to sustain an inductively coupled plasma in the torch. The aperture 101 may be optically coupled to the inductively coupled plasma in the torch and may receive light emission from analyte species in the inductively coupled plasma in the torch. After the light enters the spectrometer 100 through the aperture 101, the different wavelengths of light are spatially separated by the various optical components of the spectrometer 100 and directed to the detector 105. Specifically, after passing twice through the dispersive element 103, being dispersed by the Echelle grating 104, and directed by the mirror system 102, the different wavelengths of light incident at the detector 105 may be spatially separated, and thus, individual wavelengths of the light emitted by analyte species may be detected. The Echellogram 201 shows the spatially separated wavelengths of the light corresponding to various analyte species and detected at the detector 105.

Figure 3:
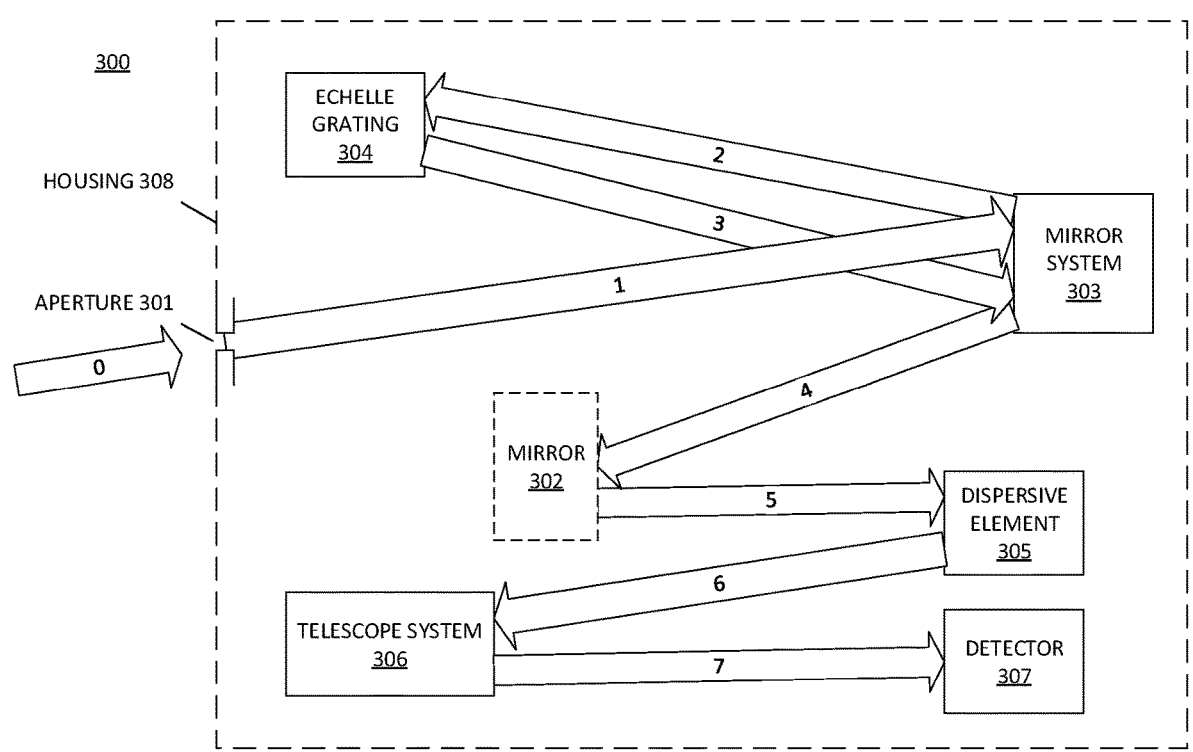
FIG. 3 is another example of a spectrometer.

FIG. 3 shows an example spectrometer 300 according to some implementations. The spectrometer 300 includes a housing 308 having an aperture 301 in the housing 308, a mirror 302, a mirror system 303, an Echelle grating 304, a dispersive element 305, a telescope system 306, and a detector 307. An optical input, such as light comprising a plurality of different wavelengths, enters the spectrometer 300 through the aperture 301. In some implementations, the aperture may be a slit. In some implementations, the spectrometer 300 may be part of an inductively coupled plasma (ICP) spectrometer and the aperture 301 may receive light from an inductively coupled plasma (ICP) system wherein samples are injected into a plasma via a sample introduction device. The sample introduction device may be fluidically coupled to a torch. An induction device may provide radio frequency energy into the torch to sustain an inductively coupled plasma in the torch. The aperture 301 may be optically coupled to the inductively coupled plasma in the torch and may receive light emission from analyte species in the inductively coupled plasma in the torch.

The aperture 301 is optically coupled to the mirror system 303. Initial light from a light source is identified by arrow labeled "0". The light entering the aperture 301 is directed to the mirror system 303, as shown in FIG. 3 by an arrow labeled "1" that points from the aperture 301 to the mirror system 303. In some implementations, the mirror system 303 may be a system that includes a single mirror or a system that includes multiple mirrors. For example, the mirror system 303 may include a three-mirror system such as a reflective triplet telescope or imager. In some examples, the mirror system 303 may include a different number of mirrors. In some implementations, the mirror system 303 may include a primary mirror optically coupled to the aperture 301, a secondary mirror optically coupled to the primary mirror, and a tertiary mirror optically coupled to the secondary mirror. The mirror system 303 may provide one or more wavelengths of light in the received light.

The mirror system 303 is optically coupled to the Echelle grating 304. The light reflected by the mirror system 303 is directed to the Echelle grating 304 as shown in FIG. 3 by an arrow labeled "2" that points from the mirror system 303 to the Echelle grating 304.

The Echelle grating 304 may be a typical Echelle grating comprising a plurality of gratings having widths about the same as the wavelength of the diffracted light, resulting in diffraction of the incident light. For example, the Echelle grating 304 may be a reflective grating. With reflective gratings, such as the Echelle grating 304, the reflective portion may be tilted (blazed) to scatter a majority of the light into a desired direction of interest (and into a specific diffraction order). For multiple wavelengths of light, the same general result occurs, but it is possible for longer wavelengths of a higher order to overlap with the next order(s) of a shorter wavelength. In an Echelle grating, this behavior is deliberately selected and the blaze is optimized for multiple overlapping higher orders. The exact blaze angle used may depend on the system level specifications of the spectrometer. The resulting optical output from the Echelle grating comprises stripes with different, but overlapping, wavelength ranges. The downstream optical elements may be used to provide spatial separation in a direction perpendicular to the Echelle grating's diffraction plane to permit detection of each wavelength of light present in an incident optical input received by the spectrometer.

The Echelle grating 304 receives the light reflected by the mirror system 303 and further spectrally disperses the light incident on the Echelle grating 304. The diffraction plane of the Echelle grating 304 results in light being directed back to the mirror system 303 in a first dispersion orientation. The light dispersed by the Echelle grating 304 is provided back to the mirror system 303 as shown in FIG. 3 by an arrow labeled "3" pointing from the Echelle grating 304 to the mirror system 303.

The mirror system 303 is optically coupled to a mirror 302. The mirror system 303 receives light from the Echelle grating 304. The mirror system 303 reflects the light received from the Echelle grating 304 to the mirror 302 as shown in FIG. 3 by an arrow labeled "4" pointing from the mirror system 303 to the mirror 302.

The mirror 302 is optically coupled to the dispersive element 305. In some implementations, the dispersive element 305 may be a prism or other optical element that disperses light. The orientation of a dispersion plane of dispersive element 305 may be perpendicular to the dispersion plane of light from echelle grating 304. This perpendicular orientation of dispersal planes creates a cross-dispersion effect where previously dispersed light is dispersed again but with a different dispersion plane.

The mirror 302 receives light reflected from the mirror system 302 and reflects the received light to the dispersive element 305 as shown in FIG. 3 by an arrow labeled "5" pointing from the mirror 302 to the dispersive element 305. The dispersive element 305 receives the light reflected towards it from the mirror 302 and further disperses or spatially separates the wavelengths of light. In some implementations, the dispersive element 305 may be a double-pass reflective prism and may include a grism, a refractive prism, a reflective grating or a refractive grating.

The dispersive element 305 is optically coupled to the telescope system 306. The dispersive element 305 provides the dispersed light to the telescope system 306 as shown in FIG. 3 by an arrow labeled "6" pointing from the dispersive element 305 to the telescope system 306. The telescope system 306 is optically coupled to the detector 307. The telescope system 306 may comprise a three-mirror imaging system, a two-mirror imaging system, or other telescope (reflecting and/or refracting) to image the resulting wavelengths onto the detector 307. The light provided by the telescope system 306 is directed to the detector 307 and is shown in FIG. 3 as an arrow labeled "7" pointing from the telescope system 306 to the detector 307. The detector 105 may be any detector that can spatially resolve light incident upon the detector 105. In some implementations, the detector 307 may be a charged coupled device (CCD) camera or a complementary metal-oxide-semiconductor detector.

Figure 4:
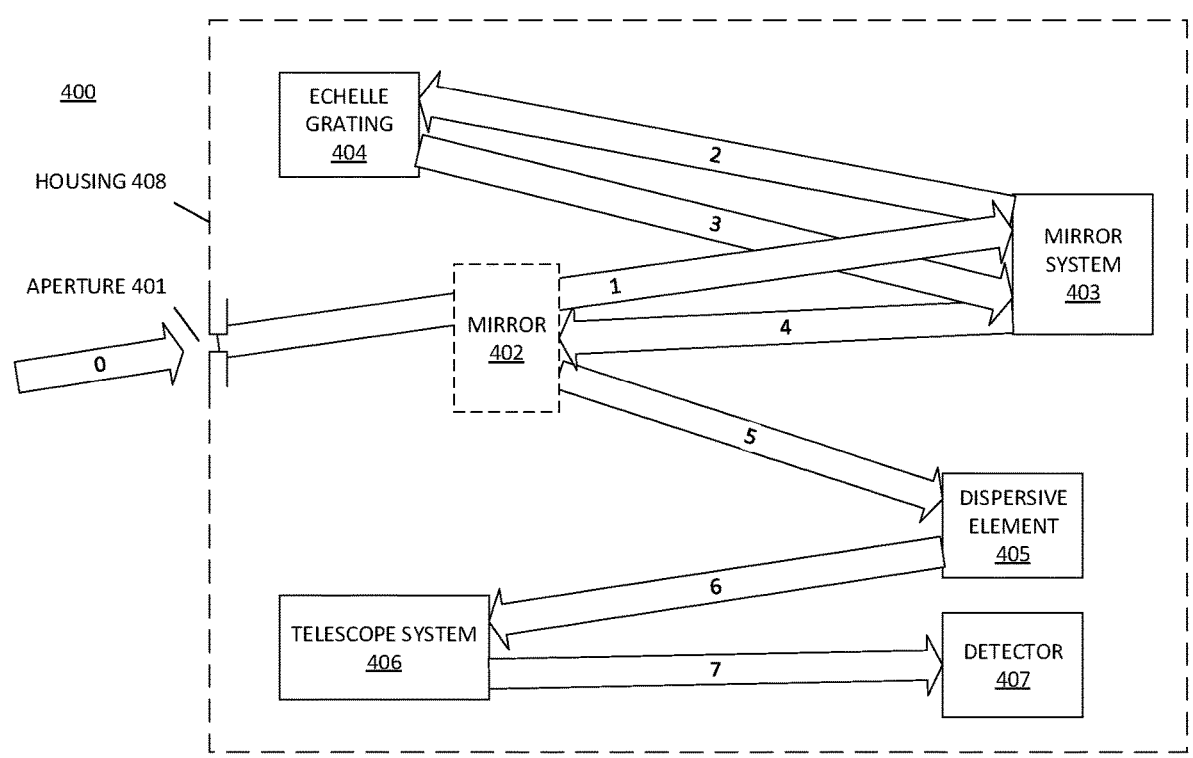
FIG. 4 is yet another example of a spectrometer.

FIG. 4 shows an example spectrometer 400 according to some implementations. The spectrometer 400 includes a housing 408 having an aperture 401 in the housing 408, a mirror 402, a mirror system 403, an Echelle grating 404, a dispersive element 405, a telescope system 406, and a detector 407. An optical input, such as light comprising a plurality of different wavelengths, enters the spectrometer 400 through the aperture 401. In some implementations, the aperture may be a slit. In some implementations, the spectrometer 400 may be part of an inductively coupled plasma (ICP) spectrometer and the aperture 401 may receive light from an inductively coupled plasma (ICP) system wherein samples are injected into a plasma via a sample introduction device. The sample introduction device may be fluidically coupled to a torch. An induction device may provide radio frequency energy into the torch to sustain an inductively coupled plasma in the torch. The aperture 401 may be optically coupled to the inductively coupled plasma in the torch and may receive light emission from analyte species in the inductively coupled plasma in the torch.

The aperture 401 is optically coupled to the mirror 402 through the mirror 402. The mirror 402 may be a two-way mirror so that light directed towards a first side of the mirror 402 passes through the mirror 402 and light directed towards a second side of the mirror is reflected. Initial light from a light source is shown in FIG. 1 by an arrow labeled "0". The light entering the aperture 401 is directed to the mirror system 403 through the mirror 402, as shown in FIG. 4 by an arrow labeled "1" that points from the aperture 401 to the mirror system 403 through the mirror 402. In some implementations, the mirror system 403 may be a system that includes a single mirror or a system that includes multiple mirrors. For example, the mirror system 102 may include a three-mirror system such as a reflective triplet telescope or imager. In some examples, the mirror system 102 may include a different number of mirrors. In some implementations, the mirror system 403 may include a primary mirror optically coupled to the aperture 401, a secondary mirror optically coupled to the primary mirror, and a tertiary mirror optically coupled to the secondary mirror. The mirror system 403 may provide one or more wavelengths of light in the received light. Each wavelength of the reflected light provided by the mirror system 403 may be spatially separated from other provided wavelengths to permit detection of each provided wavelength of light.

The mirror system 403 is optically coupled to the Echelle grating 404. The light reflected by the mirror system 403 is directed to the Echelle grating 404 as shown in FIG. 4 by an arrow labeled "2" that points from the mirror system 403 to the Echelle grating 404. The Echelle grating 404 may be a typical Echelle grating comprising a plurality of gratings having widths about the same as the wavelength of the light, resulting in diffraction of the incident light. For example, the Echelle grating 404 may be a reflective grating. With reflective gratings, such as the Echelle grating 404, the reflective portion may be tilted (blazed) to scatter a majority of the light into a desired direction of interest (and into a specific diffraction order). For multiple wavelengths of light, the same general result occurs, but it is possible for longer wavelengths of a higher order to overlap with the next order(s) of a shorter wavelength. In an Echelle grating, this behavior is deliberately selected and the blaze is optimized for multiple overlapping higher orders. The exact blaze angle used may depend on the system level specifications of the spectrometer. The resulting optical output from the Echelle grating comprises stripes with different, but overlapping, wavelength ranges. The downstream optical elements may be used to provide spatial separation in a direction perpendicular to the Echelle grating's diffraction plane to permit detection of each wavelength of light present in an incident optical input received by the spectrometer.

The Echelle grating 404 receives the light reflected by the mirror system 403 and further spectrally disperses the light incident on the Echelle grating 404. The diffraction plane of the Echelle grating 404 results in light being directed back to the mirror system 403 in a first dispersion orientation. The light dispersed by the Echelle grating 404 is provided back to the mirror system 403 as shown in FIG. 4 by an arrow labeled "3" pointing from the Echelle grating 404 to the mirror system 403.

The mirror system 404 is optically coupled to the mirror 402. The mirror 402 may be a two-way mirror so that light directed towards a first side of the mirror 402 passes through the mirror 402 and light directed towards a second side of the mirror is reflected.

The mirror system 403 reflects the light received from the Echelle grating 404 to the reflective side of the mirror 402 as shown in FIG. 4 by an arrow labeled "4" pointing from the mirror system 403 to the mirror 402.

The mirror 402 is optically coupled to the dispersive element 405. In some implementations, the dispersive element 405 may be a cross-disperser. The mirror 402 receives light reflected from the mirror system 402 and reflects the received light to the dispersive element 405 as shown in FIG. 4 by an arrow labeled "5" pointing from the mirror 402 to the dispersive element 405. The dispersive element 405 receives the light reflected towards it from the mirror 402 and further disperses or spatially separates the wavelengths of light. In some implementations, the dispersive element 405 may be a double-pass reflective prism and may include a grism, a refractive prism, a reflective grating or a refractive grating.

The dispersive element 405 is optically coupled to the telescope system 406. The dispersive element 405 provides the dispersed light to the telescope system 406 as shown in FIG. 4 by an arrow labeled "6" pointing from the dispersive element 405 to the telescope system 406. The telescope system 406 is optically coupled to the detector 407. The telescope system 406 may comprise a three-mirror imaging system, a two-mirror imaging system, or other telescope (reflecting and/or refracting) to image the resulting wavelengths onto the detector 407. The light provided by the telescope system 406 is directed to the detector 407 and is shown in FIG. 4 as an arrow labeled "7" pointing from the telescope system 406 to the detector 407. The detector 407 may be any detector that can spatially resolve light incident upon the detector 407. In some implementations, the detector 407 may be a charged coupled device (CCD) camera or a complementary metal-oxide-semiconductor detector.

The spectrometer architecture and imager described herein provides a single detector, compact, and high-throughput spectrometer that may address the requirements of the next platform OES system. The high performance design of the spectrometers according to one or more aspects eliminate the need for an additional optical element for a collimator and is thus, is suitable for high performance compact echelle spectrometer applications. In some implementations, the spectrometer captures the UV and the visible spectrum simultaneously on a single detector with high optical throughput and resolution. Eliminating an extra optical element for the collimator also reduces the cost of the system. The spectrometers according to one or more aspects may integrate with a camera at the image plane and with a light source through a set of transport optics at the aperture.

What is claimed is:

1. A spectrometer comprising:
   an aperture configured to permit passage of light;
   a dispersive element;
   an Echelle grating;
   a three-mirror system comprising a reflective triplet telescope; and
   a detector,
   wherein at least one reflecting surface of the three-mirror system is optically coupled to the aperture and is optically coupled to the Echelle grating through the dispersive element,
   wherein light received by the aperture is directed to the at least one reflecting surface,
   wherein the light directed from the aperture to the at least one reflecting surface is reflected by the at least one reflecting surface to the Echelle grating,
   wherein light provided by the Echelle grating is directed from the Echelle grating to the at least one reflecting surface, and
   wherein the light directed from the Echelle grating to the at least one reflecting surface is reflected by the at least one reflecting surface to the detector.

2. The spectrometer of claim 1,
   wherein the light directed from the aperture to the at least one reflecting surface is reflected by the at least one reflecting surface to the Echelle grating through the dispersive element, and
   wherein the light provided by the Echelle grating is directed to the at least one reflecting surface through the dispersive element.

3. The spectrometer according to claim 1,
   wherein the dispersive element comprises a prism.

4. The spectrometer according to claim 1,
   wherein the dispersive element comprises a double-pass prism.

5. The spectrometer according to claim 1,
   wherein the dispersive element comprises a grating.

6. The spectrometer according to claim 1,
wherein the dispersive element comprises a grism.

7. The spectrometer according to claim 6, wherein the reflective triplet telescope further comprises:
a primary mirror optically coupled to the aperture;
a secondary mirror optically coupled to the primary mirror; and
a tertiary mirror optically coupled to the secondary mirror, wherein the tertiary mirror is optically coupled to the Echelle grating through the dispersive element.

8. The spectrometer according to claim 1, wherein the spectrometer receives light from an inductively coupled plasma system.

9. The spectrometer according to claim 1, wherein a diffraction plane of the Echelle grating is perpendicular to a dispersion plane of the dispersive element.

10. The spectrometer according to claim 1, wherein the aperture is optically coupled to the mirror system.

11. The spectrometer according to claim 1, wherein the light directed from the Echelle grating to the at least one reflecting surface comprises cross-dispersed light.

12. A spectrometer comprising:
an aperture configured to permit passage of light;
a dispersive element;
an Echelle grating;
a reflective triplet telescope comprising a mirror system;
a mirror;
a telescope system; and
a detector,
wherein the aperture is optically coupled to the mirror system, the mirror system is optically coupled to the Echelle grating, and is optically coupled to the mirror,
wherein light received by the aperture is directed to the mirror system,
wherein the light directed from the aperture to the mirror system is reflected by the mirror system to the Echelle grating,
wherein light provided by the Echelle grating is directed from the Echelle grating to the mirror system, and
wherein the light directed from the Echelle grating to the mirror system is reflected by the mirror system to the detector.

13. The spectrometer of claim 12,
wherein the mirror is optically coupled to the telescope system through the dispersive element, and
wherein the dispersive element is optically coupled to the detector.

14. The spectrometer according to claim 12, wherein the dispersive element comprises a prism.

15. The spectrometer according to claim 12, wherein the dispersive element is a double-pass prism.

16. The spectrometer according to claim 12, wherein the dispersive element comprises a grating.

17. The spectrometer according to claim 12, wherein the dispersive element comprises a grism.

18. The spectrometer according to claim 12,
wherein the mirror comprises a first side opposite a second side,
wherein the first side of the mirror comprises a non-reflective surface,
wherein the second side of the mirror comprises a reflective surface,
wherein the aperture is optically coupled to the mirror system through the first side of the mirror,
wherein the light received by the aperture is directed to the mirror system through the mirror,
wherein the mirror system is optically coupled to the second side of the mirror, and
wherein the light directed from the Echelle grating to the mirror system is reflected by the mirror system to the second side of the mirror.

19. The spectrometer according to claim 12, wherein the spectrometer receives light from an inductively coupled plasma system.

20. The spectrometer according to claim 12, wherein the light directed from the Echelle grating to the mirror system comprises cross-dispersed light.

\* \* \* \* \*